April 18, 1933.  C. LORBER  1,904,741
METHOD AND MEANS FOR PACKETING DOUGH
Filed Sept. 9, 1931   2 Sheets-Sheet 1

Inventor
Charles Lorber
By E. J. Clarkson
Attorney

April 18, 1933.  C. LORBER  1,904,741

METHOD AND MEANS FOR PACKETING DOUGH

Filed Sept. 9, 1931  2 Sheets-Sheet 2

Inventor
Charles Lorber
By E. J. Clarkson
Attorney

Patented Apr. 18, 1933

1,904,741

UNITED STATES PATENT OFFICE

CHARLES LORBER, OF LOUISVILLE, KENTUCKY

METHOD AND MEANS FOR PACKETING DOUGH

Application filed September 9, 1931. Serial No. 561,944.

This invention relates to a method and means for packeting dough and has special reference to an improvement in the method and means for this purpose shown and described in the patent L. B. Willoughby, No. 1,811,772, dated June 23, 1931.

It has been found that certain objections exist in the method and means set forth in the above described patent and among these objections may be mentioned that after the biscuits of said patent have raised and closed the vent the production of gases continues for some time whereby the removal of the container top results in the biscuit portions or some of them being violently forced out of the container, the end biscuits being ejected with sufficient force to throw them frequently for some distance. Attempts have been made to remedy this in practice by suggesting the cutting of the container around the middle but such cutting has been ineffectual because the two ends of the container will be violently separated with resultant distortion of the dough masses. Moreover, cutting in the middle of the container and quick separation of the ends from internal gas pressure is apt to cause slipping of the knife used in the cutting operation with consequent wounding of the person opening the packet.

One object of the present invention is to provide an improved method of packeting dough masses in such manner that excess gas generated in the packet will be allowed to escape before the packet is opened to permit removal of the dough.

A second important object of the invention is to provide an improved packet for this purpose having means to prevent closing by the dough of the gas escape vent provided in such packet.

A third important object of the invention is to provide means for closing such a gas vent so arranged that the vent may be opened from the outside.

A fourth important object of the invention is to provide a packet of this kind having a vent opening and means to prevent closing of the opening by the dough, in combination with an outer wrapping covering the opening and readily torn by pressure of a finger to open the opening.

A fifth important object of the invention is to so arrange the means for preventing the dough from closing the vent opening that such means will prevent the dough from being contacted by the finger or implement used in perforating the wrapper.

With the above and other objects in view, the invention consists in general of certain novel details of construction and combinations of parts and of a novel method of packeting hereinafter fully described, illustrated in the accompanying drawings and specifically claimed.

In the accompanying drawings like characters of reference indicate like parts in the several views, and:

In the embodiments of the packet here shown there is disclosed a long cylindrical container body 10 having its lower end closed and its upper end open but arranged to be closed by a cap 11. This body 10 is preferably provided with a lining 12 of some suitable moisture proof material such as paraffin or other material having like characteristics.

Figure 1:
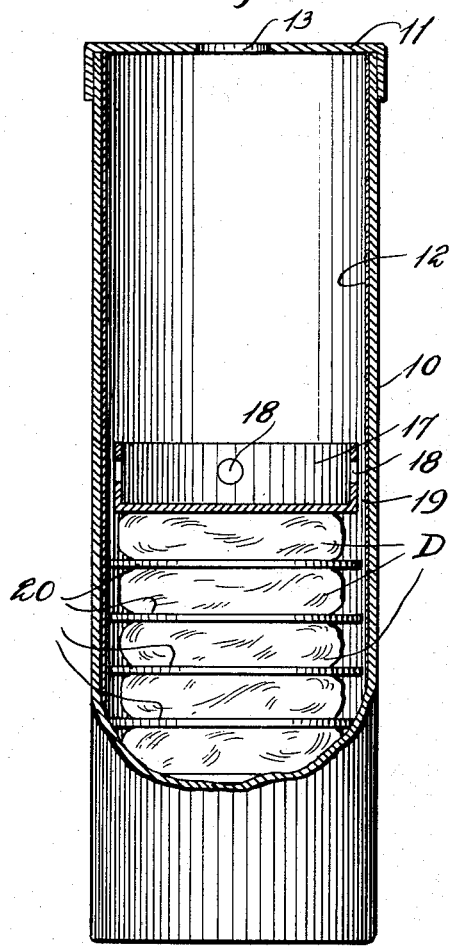
Figure 1 is a side elevation, partly in section, of one form of inner container used herein and showing the condition of the interior before the dough has risen.
Figure 2:
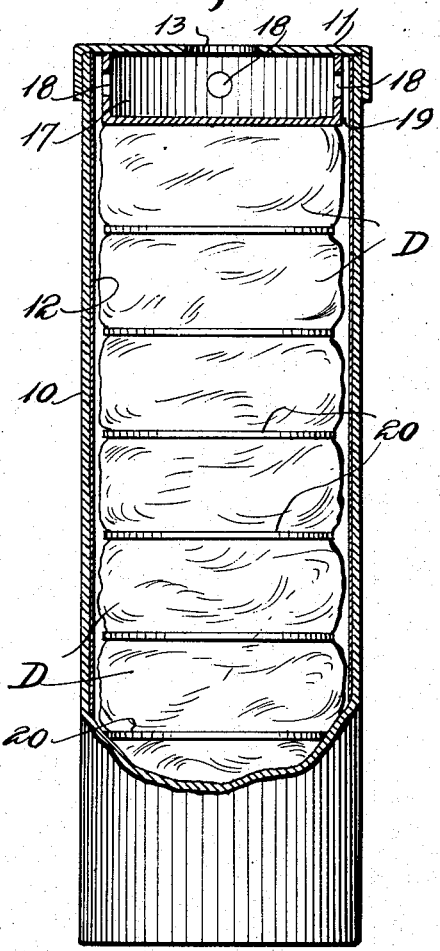
Figure 2 is a similar view after the dough has risen.
Figure 3:
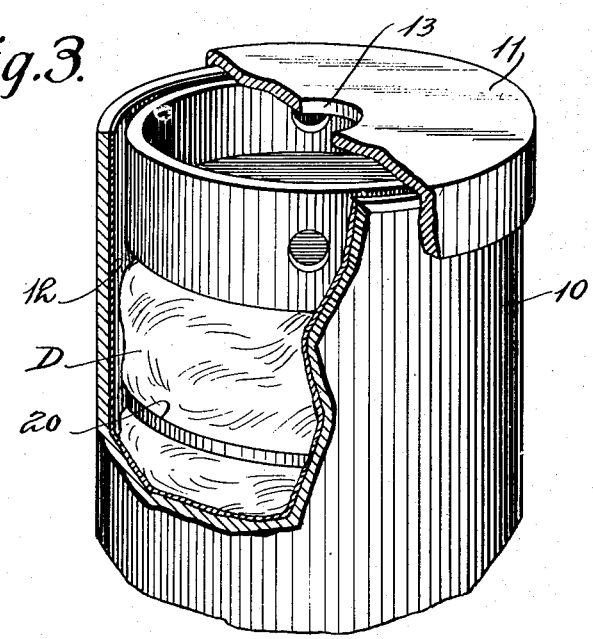
Figure 3 is an enlarged perspective view of the upper part of such an inner container partly broken away and showing the dough raised.
Figure 4:
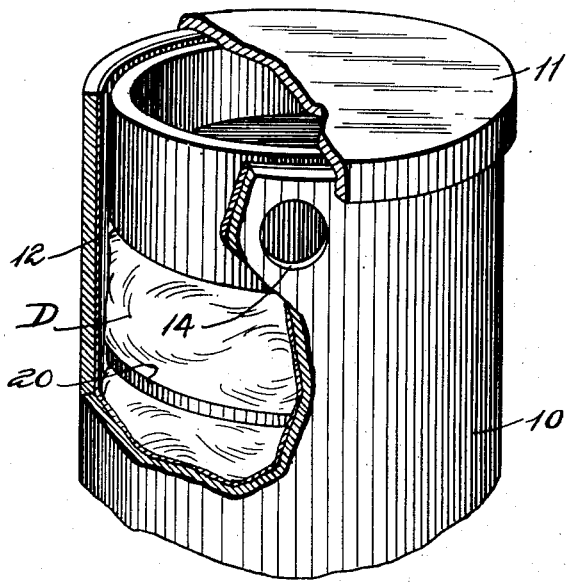
Figure 4 is a view similar to Figure 3 but showing a modification.
Figure 8:
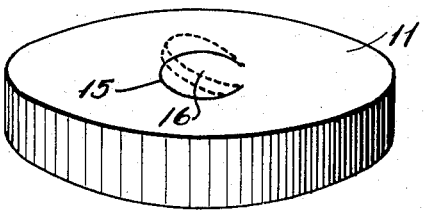
Figure 8 is a perspective view of a top for the inner container disclosing a modified form of vent.

In the form shown in Figures 1 and 2 the top 11 is provided with a centrally disposed vent opening 13. In Figure 4 the vent opening 14 is formed in the body just below the rim or flange of the cap. In Figure 8 a further modification of the vent is shown at 15, a flap 16 serving to form a closure for this opening.

Within the container is a shallow cylindrical cup 17 of considerably less diameter than the interior of the body and having a plurality of vent openings 18 in its side wall. By reason of the difference in diameters a passage 19 is left between the side walls of the cup and container body. In Figure 4 these vents 18 are omitted.

In using this feature of the invention the dough masses D, separated by discs 20, are packed in the body 10 and the top 11 fitted on the upper end of the body. As the dough rises it lifts the cup 17 until the latter strikes the top 11. In the forms shown in Figures 1, 2, and 8 any excess gases pass up the space 19 and through the vents 18 into the cup 17 from whence they pass out of the vent 13 or 15 as the case may be. In the form shown in Figure 4 the gases pass from the passage 19 directly through the vent opening 14. In each of these forms it will be seen that the dough is restrained from closing the vent opening.

Figure 5:
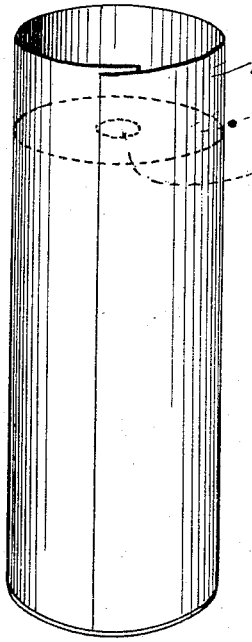
Figure 5 is a perspective view showing such a container with the outer wrapper applied but not folded to close the vent.
Figure 6:
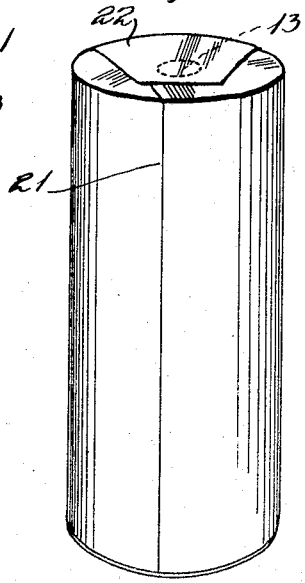
Figure 6 is a view similar to Figure 5 but showing the wrapper folded to close the container vent.

As shown in Figure 5 a wrapper 21 is placed around the container and its end is folded down as in Figure 6 at 22 which will close the vent 13 if this form is used.

Figure 7:
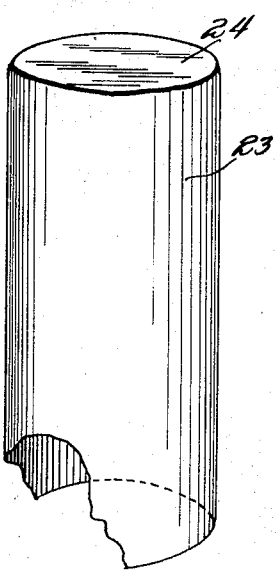
Figure 7 is a perspective view of a modified form of wrapper.

In Figure 7 the wrapper 23 is provided with a closed end 24 and is applied from the upper end of the container downwardly so that the end 24 will close the vent.

In all of these forms the wrapper may be punched with the finger or a suitable implement at the vent opening before being removed to free the top 11 for its removal. When thus punched any gases which may have collected in the container will escape so that there is no excess gas pressure in the container but the pressure within is the same as the exterior air pressure. There is thus no tendency for the container to blow open or for the contents to be violently ejected. After the punching operation the wrapper may be removed, at least at the top, and the top removed and the contents extracted. Moreover, by reason of the presence of the cup 17 the punching operation will be accomplished without the finger or punching implement contacting the dough.

In the method of packeting it is to be seen that while the dough masses are packed in a vented container they are in each case effectually restrained from contacting with the vented portion of the container and thereby closing the vent. It will further be noted that the vent is closed with a readily frangible closure in the form of a wrapper.

There has thus been provided an improved method of packeting dough masses and simple and efficient means for carrying this method into effect.

It is obvious that changes may be made in the form and construction of the means herein described without departing from the material principles involved. It is not therefore desired to confine the invention to the employment of the specific means here disclosed but it is desired to include all such as come within the scope of the appended claims.

What is claimed, is:

1. A method of packeting raw dough preservatively for commercial purposes which consists in applying the dough within a closed container having a vent opening, causing the dough to expand within the container, and restraining the expanded dough from closing the vent opening to provide space for the accumulation of generated gases.

2. A method of packeting raw dough preservatively for commercial purposes which consists in applying the dough within a closed container having a vent opening, causing the dough to expand within the container, restraining the expanded dough from closing the vent opening to provide space for the accumulation of generated gases, and closing said vent opening after the dough has expanded to expel the major portion of the air in the container.

3. A method of packeting raw dough preservatively for commercial purposes which consists in applying the dough within a closed container having a vent opening, causing the dough to expand within the container, restraining the expanded dough from closing the vent opening to provide space for the accumulation of generated gases, and wrapping the container after the dough has expanded and the major portion of the air has been expelled and thereby closing the vent.

4. A packet for dough masses including a container having a closure provided with a central vent opening, a guard in said container arranged to prevent dough in the container from closing the vent opening, and means for closing the opening to provide an air space therebelow.

5. A packet for dough masses including a closed container having a vent opening at one end, and a cup in said container arranged to fit in the closed end in spaced relation to the vent opening, said cup forming a guard to prevent dough from closing the vent opening.

6. A packet for dough masses including a closed container having a vent opening at one end, and a cup in said end of less diameter than the container to provide an air passage between the cup and side wall of the container, said cup having its rim engaging the top of the container whereby the bottom of the cup holds the dough spaced from said top.

7. A packet for dough masses including a closed container having a vent opening in one end, and a cup having a side wall engaging at its edge with the vented end of the container and provided with vents in said side wall, said cup being of less diameter than the container to provide an air passage between the side walls of the cup and container.

8. A packet for dough masses including a closed container having a vent opening in its side wall adjacent one end, and a cup in said end having a side wall of sufficient depth to engage said end and extend over the vent toward the other end, said cup being of less diameter than the container to provide an air passage to the vent opening.

9. A packet for dough masses including a container having a closure provided with a central vent opening, a guard in said container arranged to prevent dough in the container from closing the vent opening, and a wrapper around said container and closing said vent opening.

10. A packet for dough masses including a closed container having a vent opening at one end, a cup in said container arranged to fit in the closed end in spaced relation to the vent opening, said cup forming a guard to prevent dough from closing the vent opening, and a wrapper around said container and closing said vent opening.

11. A packet for dough masses including a closed container having a vent opening at one end, a cup in said end of less diameter than the container to provide an air passage between the cup and side wall of the container, said cup having its rim engaging the top of the container whereby the bottom of the cup holds the dough spaced from said top, and a wrapper around said container and closing said vent opening.

12. A packet for dough masses including a closed container having a vent opening in one end, a cup having a side wall engaging at its edge with the vented end of the container and provided with vents in said side wall, said cup being of less diameter than the container to provide an air passage between the side walls of the cup and container, and a wrapper around said container and closing said vent opening.

13. A packet for dough masses including a closed container having a vent opening in its side wall adjacent one end, a cup in said end having a side wall of sufficient depth to engage said end and extend over the vent toward the other end, said cup being of less diameter than the container to provide an air passage to the vent opening, and a wrapper around said container and closing said vent opening.

In testimony whereof I affix my signature.

CHARLES LORBER.